United States Patent Office 3,382,083
Patented May 7, 1968

3,382,083
FILLED INORGANIC STRUCTURAL COMPOSITIONS HAVING IMPROVED STRENGTH
James G. Marsden, Tonawanda, and Samuel Sterman, Williamsville, N.Y., assignors to Union Carbide Corporation, a corporation of New York
No Drawing. Filed Mar. 5, 1964, Ser. No. 349,766
10 Claims. (Cl. 106—98)

The present invention relates in general to the method of improving the adhesion of siliceous materials to inorganic structural materials. More particularly it relates to the method of improving the strength of glass fiber reinforced gypsum compositions and to the articles produced thereby.

The use of fibrous fillers in settable argillaceous and cement-like substances to increase flexural and tensile strength properties is conventional practice in the art. For example, a recent innovation in the manufacture of gypsum dry wall is to entrap air in the gypsum prior to the "setting" or cure to produce a foamed product of lower density. Whereas the low density imparts many desirable properties, there is also a commensurate loss in strength properties. As one way to overcome the loss in strength without increasing the density it has been proposed to incorporate into the composition fiber glass in the form of chopped strand. While this brings about an improvement in strength in the dry wall, it does not produce the maximum reinforcement benefit of which the fiber glass is capable for the reason that the glass fibers do not adhere well to the gypsum. This lack of adhesion is apparent from an examination of the broken edge of a typical sample of glass reinforced gypsum wall board. It is readily observed that a number of glass fiber "hairs" protrude from the edge which have pulled loose from the gypsum during the break.

In another example, clay materials such as those used in the preparation of pottery and other ceramic articles, are ordinarily preformed from a moldable mass and thereafter fired to a permanent, cured condition. Before firing the clay is in a so-called "green" state having very little strength. Siliceous fillers, particularly those of a fibrous nature, when incorporated into the unfired form increase the strength properties and decrease breakage during handling before firing. Although the use of fillers provides some improvement, greater improvement can be accomplished by increasing the bond strength of the filler to the clay base composition.

It is therefore an object of the present invention to provide a method for improving the adhesion of siliceous fillers to inorganic and mineral derived compositions.

It is a more particular object to provide a method for improving the adhesion of glass fillers to gypsum in dry walls.

These and other objects which will be obvious from the specification hereinafter are accomplished in accordance with the method of the present invention by applying a coating of an organofunctional silane or siloxane to the surface of a siliceous filler material and incorporating the coated filler into the inorganic composition.

The organo-functional silicon compounds suitably employed include silanes having the general formula:

(I) 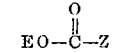

wherein R' is a monovalent hydrocarbon radical, R is an alkyl radical containing from 1 to about 8 carbon atoms, $a$ is an integer having a value of from zero to 2 inclusive, and Q is a member selected from the group consisting of
(a) $-(CH_2)_n-NQ'_2$ wherein $n$ is an integer having a value of from 1 to 2 inclusive and Q' is a member selected from the class consisting of hydrogen and $-(CH_2)_2NH_2$;

(b) 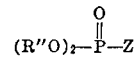

wherein E is a member selected from the class consisting of hydrogen and alkyl groups containing from 1 to 3 carbon atoms, preferably 2, and Z is an alkylene radical containing from zero to 2 carbon atoms inclusive;

(c) 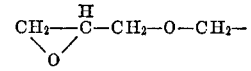

wherein R'' is a monovalent hydrocarbon radical preferably free of acetylenic unsaturation and Z is an alkylene radical containing from zero to 2 carbon atoms inclusive; and (d) $CH_2-\overset{H}{\underset{\diagdown O \diagup}{C}}-CH_2-O-CH_2-$ Alkyl groups represented by R, R' and R'' include methyl, ethyl, propyl, butyl, aryl and octyl. In addition R' and R'' can be cycloaliphatic (e.g. cyclopentyl, cyclohexyl, etc.); aryl (e.g. phenyl, diphenyl, naphthyl, etc.); alkaryl (e.g. tolyl, xylyl, ethylphenyl, etc.); aralkyl (e.g. benzyl, methylbenzyl, phenylethyl, phenylbutyl, etc.) and their homologs.

The silicon containing coupling agents also include the hydrolysis and condensation siloxane products of the aforesaid silanes, i.e. homopolymers containing units of the general formula:

(II) 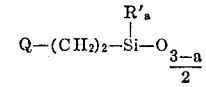

wherein R', Q, and $a$ have the same values and represent the same groups as in Formula I above, and copolymers containing from 0.1 to 99.9 mole percent of the units of Formula II and from 99.9 to 0.1 mole percent of units represented by the general formula:

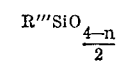

wherein R''' is a monovalent hydrocarbon as defined with respect to R' in Formula I above, and $n$ is an integer having a value of from 1 to 3 inclusive.

Specifically illustrative of the silanes of Formula I are gamma - aminopropyltriethoxysilane, gamma - glycidoxypropyltrimethoxysilane, dimethoxy phosphonoethyltrimethoxysilane, beta - carboxyethyltripropoxysilane, diethoxy phosphonobutyltriethoxysilane, delta - aminobutyltrimethoxysilane, delta - carboxybutyltripentoxysilane, dipropoxy phosphonoethyl(methyl)dipropoxysilane, gamma(N-ethylamino)aminopropyltriethoxysilane, beta - carboxyethyl(ethyl)diethoxysilane, and the like.

It has further been found that a uniquely effective coupling agent composition is formed by admixing a gamma-aminopropyltrialkoxy silane, preferably gamma - aminopropyltriethoxysilane, with a phosphorus-containing compound having at least one oxygen atom directly bonded to a phosphorus atom thereof and which can contain in addition hydrogen, carbon, chlorine or bromine. Typical of such compounds are meta-phosphoric acid ($H_3PO_3$), pyrophosphoric acid ($H_4P_2O_7$), ortho - phosphoric acid ($H_3PO_4$), phosphorus acid, $POCl_3$, $POBr_3$, and esters of phosphoric and phosphorous acid represented by the general formula $(RO)_nR'_{3-n}PO_x$ wherein $x$ is an integer having a value of zero or 1, $n$ is an integer having a value of from zero to 3, R is in each occurrence hydrogen or a monovalent hydrocarbon radical and R' is in each occurrence a monovalent hydrocarbon radical. Specifically illustrative of this class of esters are (CH$_3$O)$_3$P, (C$_2$H$_5$)$_2$P—CH$_3$, (CH$_3$O)$_3$PO (C$_6$H$_5$O)P(OH)$_2$, CH$_3$(OH)$_2$PO and the like.

Especially preferred as the phosphorus compound is phosphorous acid. The precise chemical composition of the resulting mixture is not readily reducible to structural representation due in part to the complexity of interaction between the silicon compound and the phosphorus compound occurring in admixture, and in part to the apparent rearrangement of these reaction products in contact with the substrate surface. Although we do not wish to be bound by any particular theory, it is believed that upon admixture, at least some of the silane reacts via a condensation or equilibration mechanism to produce a polymeric product containing $$\text{Si—O—P or Si—O—}\overset{\text{O}}{\underset{\|}{\text{P}}}\text{ units}$$

The proportions of gamma-aminopropyltrialkoxysilane and phosphorus compound admixed prior to application is not narrowly critical, but in general from about 0.04 to about 10 mole atoms of phosphorus per mole atom of silicon are suitable, with from about 0.12 to about 2 mole atom of phosphorus per mole atom of silicon being preferred.

The mixture of gamma-aminopropyltrialkoxysilane and phosphorus compound, as well as one or a mixture of two or more of the silanes and siloxanes described hereinbefore can consist solely of these materials, or can contain in addition inert ingredients such as solvents, diluents, pigments, colorants and the like. Suitable solvents or diluents include liquid organic materials such as ethanol, toluene, butyl "Cellosolve" and n-butanol. Water can also be employed in quantities which are less than or equal to the stoichiometric quantity required to condense the unreacted hydrolyzable hydrocarbyloxy groups of the silicon compound, or can be employed in sufficient excess of this function to serve as a solvent or diluent.

The coupling agents described hereinbefore can be applied to the desired siliceous filler material by any convenient conventional method. For example the filler can be dipped in the coupling agent, or the coupling agent can be sprayed on the filler material.

The siliceous fillers suitably employed can be either fibrous in nature or particulate in form, although the fibrous form is preferred. Thus ground glass, ground quartz, silica, e.g. sand, and glass beads are suitable, but preferably fibrous asbestos or finely drawn glass fibers are employed. The quantity of these fillers employed is of course not critical and in general follows the practice heretofore conventional in the art in which non-treated fillers are employed.

The settable inorganic argillaceous and cement-like materials suitably reinforced by the coated fillers of this invention include those which "cure" by virtue of chemical reaction as well as thermal modification. Typical of the cements which cure by chemical reaction is portland cement which, generally speaking, involves reaction between an argillaceous component and a calcareous component. Typical of the heat-curable materials is kaolin, which when fired at temperatures of the order of 550° C. undergoes an internal structural change, the nature of which is not fully understood. Gypsum, on the other hand, cures by hydration and recrystallization, and thus can be considered chemically cured even though quite different from the type of curing involved in portland cement.

Other illustrative materials suitably employed are block talc, steatite, pyrophyllite, feldspar, wollastonite, sillimanite, magnesium oxysulfate, magnesium oxychloride, sodium silicates of high silica content used as ceramic binder, and slips and binders in general.

More generically, the inorganic structural materials of this invention are the alkali and alkaline earth silicates and aluminates, though gypsum, being essentially calcium sulfate, cannot be so categorized. In those cases where the structural material is quite basic, i.e. a pH value of about 10 or greater, it is advantageous for permanent strength improvement to employ siliceous fillers which do not readily react with strong bases. Asbestos is entirely suitable for this purpose and is preferred for use in portland cement.

The following examples are illustrative of the present invention but are in no way intended to be limitative thereof.

Example I

The following experiment was carried out to qualitatively demonstrate the improved adhesion of glass to gypsum obtained when the glass is pretreated with a silane or silicone. Plate glass was degreased and then treated by wiping with an aqueous solution of silane or silicone. The treated glass was allowed to air dry and then heat set for 10 minutes at 115° C. After cooling to room temperature a sample of foamed gypsum slurry was applied to each treated glass specimen and to an untreated control. The gypsum was allowed to set at room temperature and then dried to constant weight at 105° F. The adhesion of gypsum to glass was qualitatively determined by attempting to lift the gypsum from the glass. The results are shown in the following table:

| Glass Treating Solution | Adhesion to Gypsum to Glass |
| --- | --- |
| None—Control | No adhesion. |
| 5% NH$_2$(CH$_2$)$_3$Si(OC$_2$H$_5$)$_3$·2H$_3$PO$_3$ in H$_2$O | Excellent. |
| 5% CH$_2$CHCH$_2$O(CH$_2$)$_3$Si(OCH$_3$)$_3$ in H$_2$O (epoxide) | Good. |
| 5% (CH$_3$O)$_2$$\overset{\text{O}}{\underset{\|}{\text{P}}}$(CH$_2$)$_2$Si(OCH$_3$)$_3$ in H$_2$O | Do. |
| 5% HO$\overset{\text{O}}{\underset{\|}{\text{C}}}$CH$_2$CH$_2$SiO$_{3/2}$ in H$_2$O | Do. |

Example II

The following experiment was carried out to demonstrate quantitatively the improved adhesion of glass to gypsum produced by pretreating the glass with a number of organo-functional silicon compounds. Glass was used in the form of spheres having a surface area of 0.047 M$^2$/g. The glass was pretreated with 0.1 wt. percent additive by adding the silane or silicone or a solution of the silane or silicone to the glass spheres, tumbling on a roll mill to uniformly distribute the silane or silicone on the glass surface and then giving the treated glass a mild heat set (2 hrs. at 100° C.). The treated glass was then incorporated into the following system.

|  | G. |
| --- | --- |
| Calcined gypsum | 200 |
| Water | 100 |

These materials were combined and stirred for 1 minute. To this was then added 170 g. of glass spheres and 40 g. of water. The complete system was then mixed for a total of 3–5 minutes. The mix was then molded into tensile specimens, allowed to set at room temperature for 20 minutes and then dried to constant weight (approximately 16 hours) at 105° F. Tensile strength was then determined at room temperature. The following table shows the results of these tests.

| Silane or Silicone | Tensile Strength (p.s.i.) of Glass-Gypsum Composite |
|---|---|
| None | 218 |
| NH$_2$CH$_2$CH$_2$CH$_2$Si(OC$_2$H$_5$)$_3$.2H$_3$PO$_3$ | 288 |
| 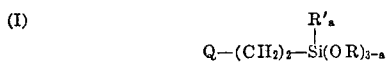 (CH$_3$O)$_2$PCH$_2$CH$_2$Si(OCH$_3$)$_3$ | 272 |
|  HOCCH$_2$CH$_2$SiO$_{3/2}$ | 260 |
| NH$_2$CH$_2$CH$_2$CH$_2$Si(OC$_2$H$_5$)$_3$ | 245 |
| 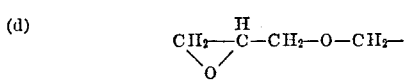 CH$_2$—CH—CH$_2$OCH$_2$CH$_2$CH$_2$Si(OCH$_3$)$_3$ | 239 |
| 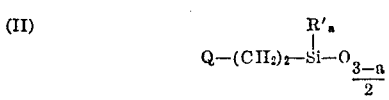 H$_2$N(CH$_2$)$_2$—N—(CH$_2$)$_3$—Si(OC$_2$H$_5$)$_3$ | 240 |

Comparable results are obtained when glass fibers are substituted for the glass beads in the foregoing procedure.

What is claimed is:

1. In a manufactured, reinforced argillaceous and cement-like inorganic structural mass article, wherein the reinforcement is an internally distributed siliceous filler, the improvement which comprises said filler being bonded to the said mass by a silicon-containing coupling agent selected from the class consisting of (A) silanes having the general formula (I)
$$Q—(CH_2)_2—\underset{\underset{(OR)_{3-a}}{|}}{Si}R'_a$$

wherein R' is a monovalent hydrocarbon radical, R is an alkyl radical containing from 1 to about 8 carbon atoms, a is an integer having a value of from zero to 2 inclusive, and Q is a member selected from the group consisting of (a) —(CH$_2$)$_n$—NQ'$_2$ wherein n is an integer having a value of from 1 to 2 inclusive and Q' is a member selected from the class consisting of hydrogen and —(CH$_2$)$_2$NH$_2$;

(b)
$$EO—\overset{O}{\underset{||}{C}}—Z$$

wherein E is a member selected from the class consisting of hydrogen and alkyl groups containing from 1 to 3 carbon atoms, and Z is an alkylene radical containing from zero to 2 carbon atoms inclusive;

(c)
$$(R''O)_2—\overset{O}{\underset{||}{P}}—Z$$

wherein R'' is a monovalent hydrocarbon radical, and Z is an alkylene radical containing from zero to 2 carbon atoms inclusive; and (d)
$$CH_2—\overset{H}{\underset{\diagdown O \diagup}{C}}—CH_2—O—CH_2—$$

(B) Siloxanes having the general formula (II)
$$Q—(CH_2)_2—\underset{\underset{O_{\frac{3-a}{2}}}{|}}{Si}R'_a$$

wherein R', Q, and a have the same values and represent the same groups as in Formula I above; (C) copolymers containing from 0.1 to 99.9 mole percent of the units of Formula II and from 99.9 to 0.1 mole percent of units represented by the general formula:

$$R_n'''SiO_{\frac{4-n}{2}}$$

wherein R''' is a monovalent hydrocarbon as defined with respect to R' in Formula I above, and n is an integer having a value of from 1 to 3 inclusive; and (D) the composition resulting from admixing gamma-aminopropyltrialkoxysilane in which the alkoxy group contains from 1 to about 8 carbon atoms with a phosphorus compound containing at least one oxygen atom directly bonded to phosphorus in the molecule.

2. The article according to claim 1 wherein the structural mass is gypsum and the siliceous filler is fiber glass.

3. The article according to claim 2 wherein the coupling agent is the composition resulting from admixing gamma-aminopropyltriethoxysilane and phosphorus acid in proportions such that the mixture contains from about 0.04 to about 10 mole atoms of phosphorus per mole atom of silicon.

4. The article according to claim 3 wherein the phosphorous acid employed is in an amount of from about 0.12 to about 2 mole atoms of phosphorus per mole atom of silicon.

5. In the method for the manufacture of argillaceous and cement-like structural masses containing siliceous reinforcing fillers the improvement which comprises incorporating as a bonding agent between the said structural mass and the siliceous filler a silicon-containing coupling agent selected from the class consisting of (A) silanes having the general formula (I)
$$Q—(CH_2)_2—\underset{\underset{(OR)_{3-a}}{|}}{Si}R'_a$$

wherein R' is a monovalent hydrocarbon radical, R is an alkyl radical containing from 1 to about 8 carbon atoms, a is an integer having a value of from zero to 2 inclusive, and Q is a member selected from the group consisting of (a) —(CH$_2$)$_n$—NQ'$_2$ wherein n is an integer having a value of from 1 to 2 inclusive and Q' is a member selected from the class consisting of hydrogen and —(CH$_2$)$_2$NH$_2$;

(b)
$$EO—\overset{O}{\underset{||}{C}}—Z$$

wherein E is a member selected from the class consisting of hydrogen and alkyl groups containing from 1 to 3 carbon atoms, and Z is an alkylene radical containing from zero to 2 carbon atoms inclusive; (c)

$$(R''O)_2—\overset{O}{\underset{||}{P}}—Z$$

wherein R'' is a monovalent hydrocarbon radical, and Z is an alkylene radical containing from zero to 2 carbon atoms inclusive; and (d)

$$CH_2—\overset{H}{\underset{\diagdown O \diagup}{C}}—CH_2—O—CH_2—$$

(B) siloxanes having the general formula (II)
$$Q—(CH_2)_2—\underset{\underset{O_{\frac{3-a}{2}}}{|}}{Si}R'_a$$

wherein R', Q, and a have the same values and represent the same groups as in Formula I above; (C) copolymers containing from 0.1 to 99.9 mole percent of the units of Formula II and from 99.9 to 0.1 mole percent of units represented by the general formula:

$$R_n'''SiO_{\frac{4-n}{2}}$$

wherein R''' is a monovalent hydrocarbon as defined with respect to R' in Formula I above, and n is an integer having a value of from 1 to 3 inclusive; and (D) the composition resulting from admixing gamma-aminopropyltrialkoxysilane in which the alkoxy group contains from 1 to about 8 carbon atoms with a phosphorus compound containing at least one oxygen atom directly bonded to phosphorus in the molecule.

6. The method according to claim 5 wherein the structural mass is gypsum and the siliceous filler is fiber glass.

7. The method according to claim 6 wherein the coupling agent is the composition resulting from admixing gamma-aminopropyltriethoxysilane and phosphorous acid in proportions such that the mixture contains from about 0.04 to about 10 mole atoms of phosphorus per mole atom of silicon.

8. The method according to claim 7 wherein the phosphorous acid employed is in an amount of from about 0.12 to about 2 mole atoms of phosphorus per mole atom of silicon.

9. The method according to claim 5 wherein the bonding agent is a member selected from the class consisting of (A) silanes having the formula (I)   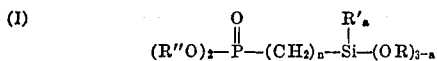

wherein R' is a monovalent hydrocarbon radical, R is an alkyl radical containing from 1 to about 8 carbon atoms, $a$ is an integer having a value of from zero to 2 inclusive, R'' is a monovalent hydrocarbon radical, and $n$ is an integer having a value of from 2 to 4 inclusive; (B) siloxanes having the general formula (II)  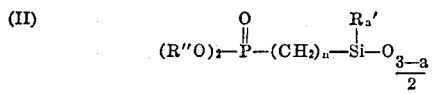

wherein R', R'', $a$ and $n$ have the same values and represent the same groups as in Formula I, and (C) copolymers containing from 0.1 to 99.9 mole percent of the units of Formula II and from 99.9 to 0.1 mole percent of units represented by the general formula:

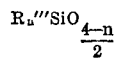

wherein R''' is a monovalent hydrocarbon as defined with respect to R' in Formula I above, and $n$ is an integer having a value of from 1 to 3 inclusive.

10. The method according to claim 5 wherein the bonding agent is a member selected from the class consisting of (A) silanes having the general formula (I)   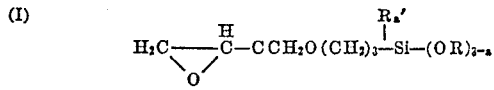

wherein R' is a monovalent hydrocarbon radical, R is an alkyl radical containing from 1 to 8 carbon atoms, $a$ is an integer having a value of from zero to 2 inclusive; (B) siloxanes having te general formula (II)  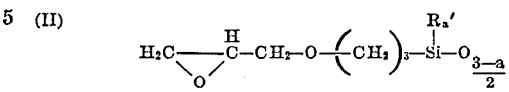

wherein R' and $a$ represent the same groups and have the same values as in Formula I above; and (C) copolymers containing from 0.1 to 99.9 mole percent of the units of Formula II and from 99.9 to 0.1 mole percent of units represented by the general formula

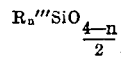

wherein R''' is a monovalent hydrocarbon radical and $n$ is an integer having a value of from 1 to 3 inclusive.

References Cited

UNITED STATES PATENTS

| | | | |
|---|---|---|---|
| 2,842,509 | 7/1958 | Shannon | 117—126 |
| 2,871,134 | 1/1959 | Loechl | 106—110 |
| 2,946,701 | 7/1960 | Plueddemann | 117—126 |
| 2,951,772 | 9/1960 | Marzocchi et al. | 117—126 |
| 3,027,274 | 3/1962 | Huntington et al. | 117—126 |
| 3,042,544 | 7/1962 | Marzocchi et al. | 117—126 |
| 3,062,670 | 11/1962 | Marzocchi et al. | 106—110 |
| 3,087,909 | 4/1963 | Morehouse et al. | 117—126 |
| 3,183,107 | 5/1965 | Alford et al. | 106—110 |
| 3,197,431 | 7/1965 | Lanham et al. | 260—448.2 |
| 3,203,923 | 8/1965 | Fekete | 260—448.2 |

OTHER REFERENCES

Fordham: Silicones, Pub. George Newnes Ltd., London, 1960, pp. 210, 211.

Meals and Lewis: Silicones, Reinhold Pub. Corp., New York, 1959, pp. 212–216.

TOBIAS E. LEVOW, *Primary Examiner.*

S. E. MOTT, *Assistant Examiner.*